(12) United States Patent
Shen et al.

(10) Patent No.: US 8,363,765 B2
(45) Date of Patent: Jan. 29, 2013

(54) METHOD AND APPARATUS FOR PROCESSING RECEIVED SIGNALS FOR SYNCHRONIZATION IN COMMUNICATION DEVICES

(75) Inventors: Jun Shen, Palo Alto, CA (US); XiangGuo Tang, Union City, CA (US)

(73) Assignee: Sun Management, LLC, Cupertino, CA (US)

( * ) Notice: Subject to any disclaimer, the term of this patent is extended or adjusted under 35 U.S.C. 154(b) by 633 days.

(21) Appl. No.: 11/856,684

(22) Filed: Sep. 17, 2007

(65) Prior Publication Data

US 2009/0075609 A1    Mar. 19, 2009

(51) Int. Cl.
*H04L 7/00* (2006.01)
(52) U.S. Cl. ........................................ 375/354
(58) Field of Classification Search .......... 375/316–317, 375/340, 354–355; 455/63.1, 501, 67.13
See application file for complete search history.

(56) References Cited

U.S. PATENT DOCUMENTS

| | | | |
|---|---|---|---|
| 4,875,045 A * | 10/1989 | Lynch et al. | 341/139 |
| 7,012,968 B2 * | 3/2006 | Kim et al. | 375/295 |
| 7,545,895 B2 * | 6/2009 | Oh et al. | 375/354 |
| 2007/0066226 A1 * | 3/2007 | Cleveland et al. | 455/63.1 |

* cited by examiner

*Primary Examiner* — Khanh C Tran
(74) *Attorney, Agent, or Firm* — Joe Zheng

(57) ABSTRACT

Techniques to generate synchronization information from received signals in communication applications are disclosed. According to one embodiment, a method for generating synchronization information from received signals includes providing a fixed gain to a received analog signal to generate a modified analog signal, converting the modified analog signal to a digital signal, extracting one or more sign bits from the digital signal, and generating synchronization information as a function of the one or more sign bits. Various embodiments can be applied in several wireless and wired communication applications.

20 Claims, 8 Drawing Sheets

METHOD AND APPARATUS FOR PROCESSING RECEIVED SIGNALS FOR SYNCHRONIZATION IN COMMUNICATION DEVICES

BACKGROUND OF THE INVENTION

1. Field of the Invention

This invention relates to voice and data communications, and more particularly to systems and methods to process received signals in communication systems.

2. Description of the Prior Art

There are several communication standards in commercial use. For example, the Institute of Electrical and Electronic Engineers (IEEE) has established a wireless standard, IEEE 802.16e. The IEEE 802.16e standard (IEEE 802.16e) outlines Media Access Control (MAC) and Physical Layer (PHY) specifications for wireless networks. The specification of the IEEE 802.16e addresses transmission of data in wireless networks. In particular, the IEEE 802.16e standard addresses communication in wireless asynchronous transfer mode (ATM) systems, covering frequencies of operation between 2.5 gigahertz (GHz) and 6 GHz. As is known in the art, IEEE 802.16e uses a modulation method called orthogonal frequency-division multiplexing access (OFDMA), which allows communication to occur at extremely high data speeds by transmitting data over multiple frequency channels over a wide frequency range.

The IEEE 802.16e specification includes mechanisms to maximize data transmission and reception reliability in packet transmission. Typically, several processes are performed in the receiver to successfully receive the transmitted data, including: synchronization, channel estimation and equalization, OFDM demodulation (e.g., by Fast Fourier Transforms), demapping, de-interleaving, decoding, and descrambling. The more relevant sections of the IEEE 802.16e specification applicable to the discussion below include sections 8.4.2, 8.4.4, and 8.4.6, which are hereby incorporated by reference.

The synchronization information of the received signals play a crucial role. For example, in OFDM systems, the frame and symbol boundary detection is very critical for reliable links between a transmitter and a receiver. One exemplary wireless communication network system is disclosed in the Mobile WiMAX Technical Overview and Performance Evaluation document prepared on behalf of the WiMAX Forum and published on Feb. 21, 2006, which is hereby incorporated by reference.

There are existing schemes for frame and symbol boundary detection. The synchronization information is typically determined by performing some operations, such as auto-correlation, cross-correlation, covariance, cross-variance of the received signals, or an equivalent. However, in the timing estimation methods presently used, the correlation calculations have high computational complexity and power consumption.

One paper that suggests the substantial challenges in synchronization in communication systems is entitled "Robust Frequency and Timing Synchronization for OFDM," written by Timothy M. Schmidl and Donald C. Cox, and published in the *IEEE Transactions on Communications*, Vol. 45, No. 12, pp. 1613-1621, (December 1997), which is incorporated by reference. This paper discusses synchronization methods, particularly for orthogonal frequency-division multiplexing (OFDM).

A second paper that suggests the substantial challenges in synchronization in wireless communication systems is entitled "ML Estimation of Time and Frequency Offset in OFDM Systems," written by Jan-Jaap van de Beek, Magnus Sandell, and Per Ola Borjesson, and published in the *IEEE Transactions on Signal Processing*, Vol. 45, No. 7, pp. 1800-1805, (July 1997), which is incorporated by reference. This paper discusses time offset and offset in carrier frequency estimations, particularly for OFDM.

FIG. 1 illustrates a flowchart of a method to generate synchronization information from received analog signals, according to the prior art. The sequence starts in operation 102. Operation 104 is next and includes inputting a received signal into an analog-to-digital (A/D) converter. Operation 106 is next and includes generating synchronization information from the output of the A/D converter. The method ends in operation 108.

FIG. 2 illustrates a receiving system that produces synchronization information, in accordance with the prior art. A/D converter 202 takes received analog signal 204 as an input and then produces a digital output 206 coupled to the synchronization information extraction module 208. Synchronization information extraction module 208 produces synchronization information 210 as an output. However, as previously noted, this module has high complexity and uses considerable power.

At higher frequencies, the signal is more directional and more easily interrupted by relative movements of the transmitter and/or receiver. Furthermore, at higher frequencies the amount of data transmitted in a unit of time increases, creating a need to avoid or minimize interruptions caused by synchronization failures. Therefore, a synchronization algorithm should be optimized as much as possible to deal with the greater vulnerabilities and consequences of the higher frequencies and faster data transmission environments.

It should be noted that some of the inventions of wireless communication systems are being adopted in wired communication systems (e.g., cable networks). Therefore, although the discussion above and below is directed to wireless communication applications, some communication challenges and solutions are common to both wireless and wired communication applications.

In view of the foregoing, what is needed is an improved method and system to generate synchronization information. Both wideband and narrowband wireless communication applications, and even wired communication applications, could benefit from such methods and systems.

SUMMARY OF THE INVENTION

The present invention can be implemented in numerous ways, such as by a method, a circuit, or a system. Three aspects of the invention are described below.

A first aspect of the invention is directed to a method to generate synchronization information from received analog signals. The method includes providing a fixed gain to a received analog signal to generate a modified analog signal, converting the modified analog signal to a digital signal, extracting one or more sign bits from the digital signal, and generating synchronization information as a function of the one or more sign bits.

A second aspect of the invention is directed to a method to generate synchronization information from received analog signals. The method includes receiving an analog signal, providing a fixed gain to the analog signal to generate a modified analog signal, converting the modified analog signal to a digital signal, extracting one or more sign bits from the digital signal, and generating synchronization information as a function of the one or more sign bits and one or more number bits.

A third aspect of the invention is directed to a system to generate synchronization information from received analog signals. The system includes a fixed gain module to provide a fixed gain to a received analog signal to generate a modified analog signal, an analog-to-digital converter to convert the modified analog signal to a digital signal, an extraction module to extract one or more sign bits from the digital signal, and a synchronization information extraction module to generate synchronization information as a function of the one or more sign bits.

These and other objects and advantages of the invention will become apparent to those skilled in the art from the following detailed description of the invention and the accompanying drawings.

DETAILED DESCRIPTION OF THE PREFERRED EMBODIMENT

The invention provides a method and a system to improve synchronization of received signals in communication systems. Various embodiments of the invention can be applied to communication applications, biological applications, medical applications, electronic applications, and any other applications where a synchronization algorithm can be beneficially used in communications. In this specification, drawings, and claims, any instance of the term radio-frequency is defined as any electromagnetic signal frequency in the frequency range of 50,000 to 100,000,000,000 cycles per second (Hertz). Certain embodiments can also be applied to the higher optical signal frequencies.

Certain embodiments of the invention can be utilized in one of or more the following communication systems: OFDM, CDMA, TDMA, and GSM. OFDM represents orthogonal frequency-division multiplexing access. CDMA represents code division multiple access. TDMA represents time division multiple access, and utilizes time-division multiplexing. GSM represents global system for mobile communications, and utilizes relatively narrowband TDMA. In addition to radio-frequency wireless communications, it should also be noted that wired communication applications (e.g., cable) can also benefit from certain embodiments of the invention.

Figure 1:
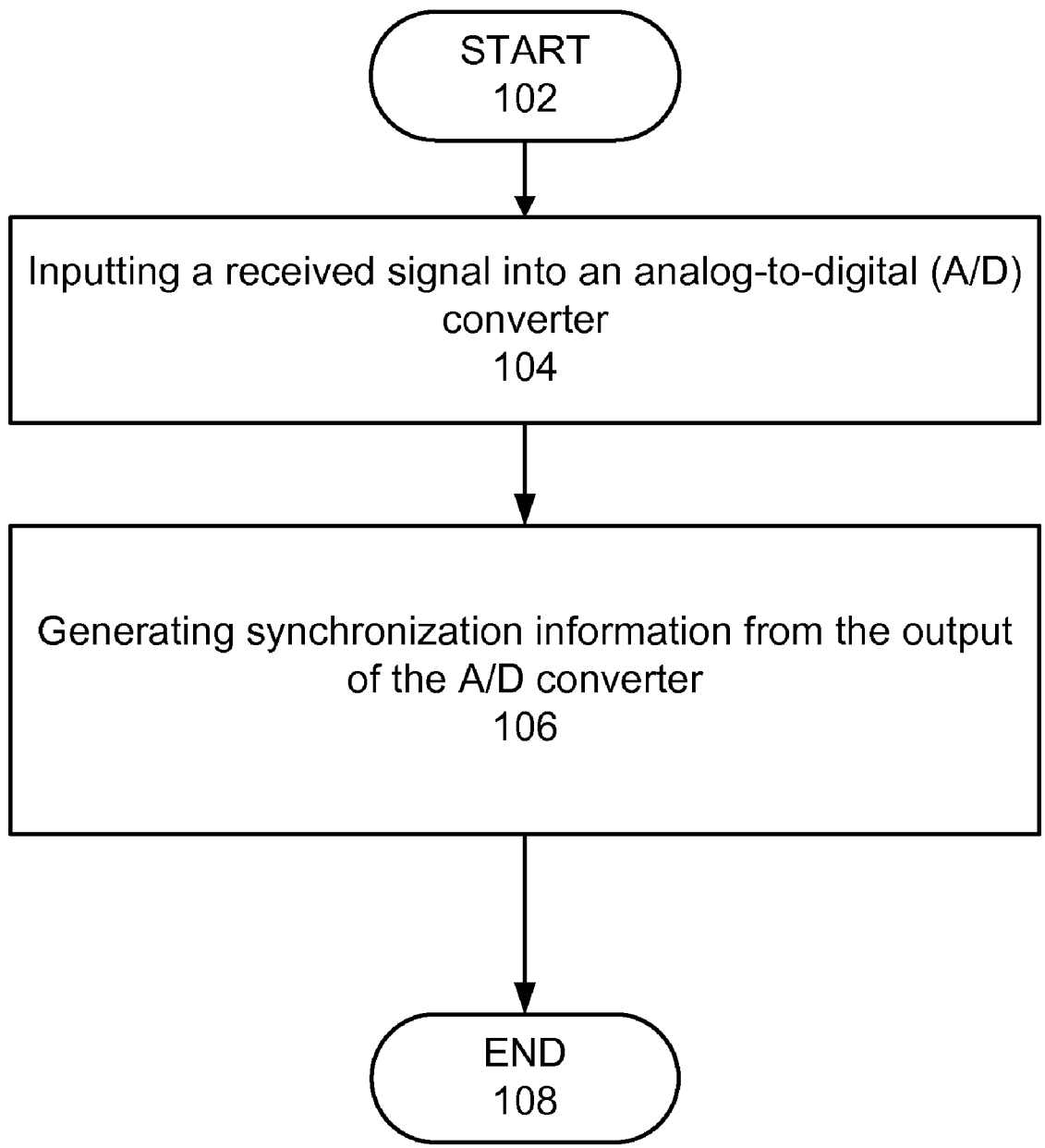
FIG. 1 illustrates a flowchart of a method to generate synchronization information from received analog signals, according to the prior art.
Figure 2:
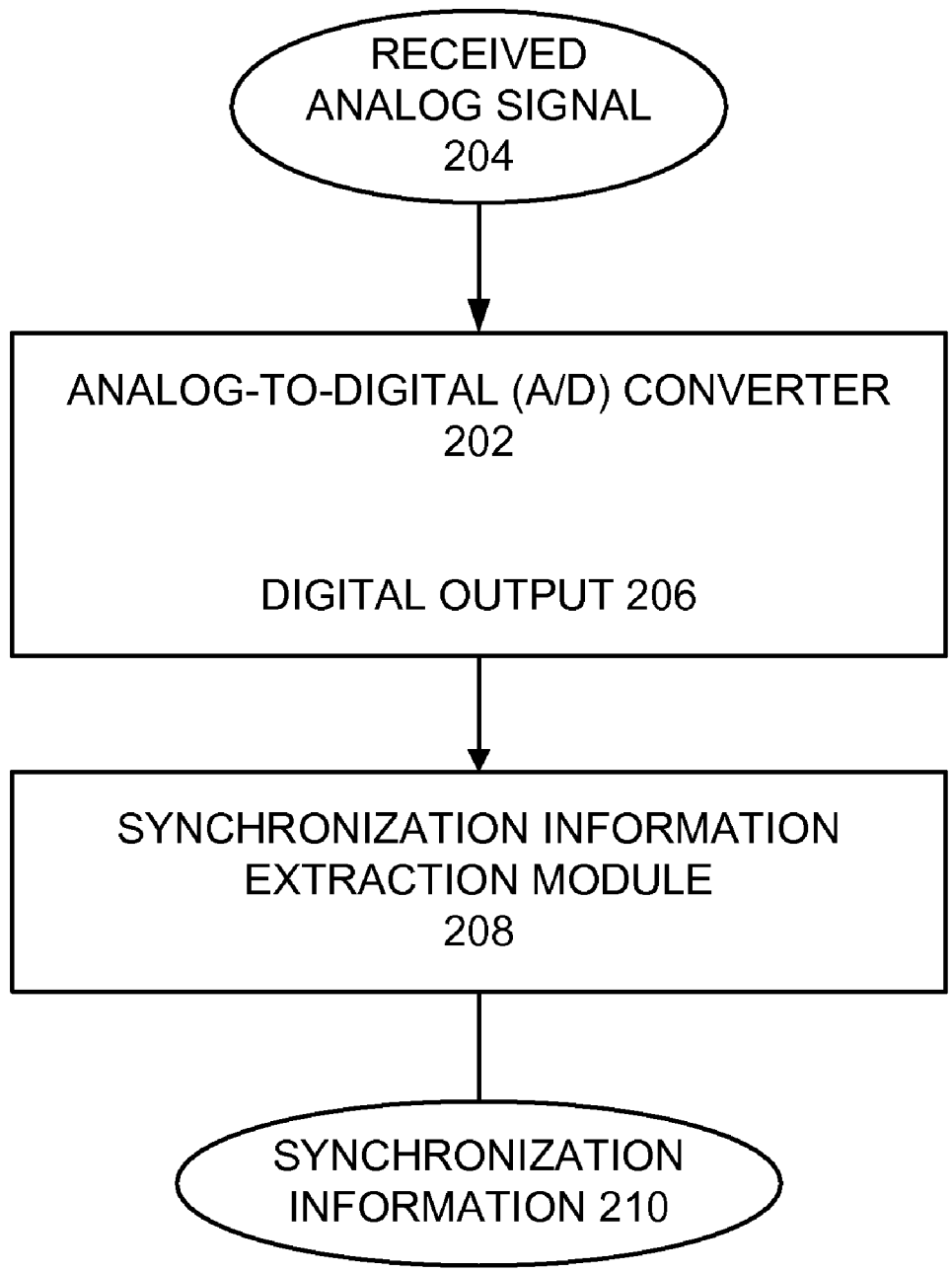
FIG. 2 illustrates a receiving system that produces synchronization information, in accordance with the prior art.
Figure 3:
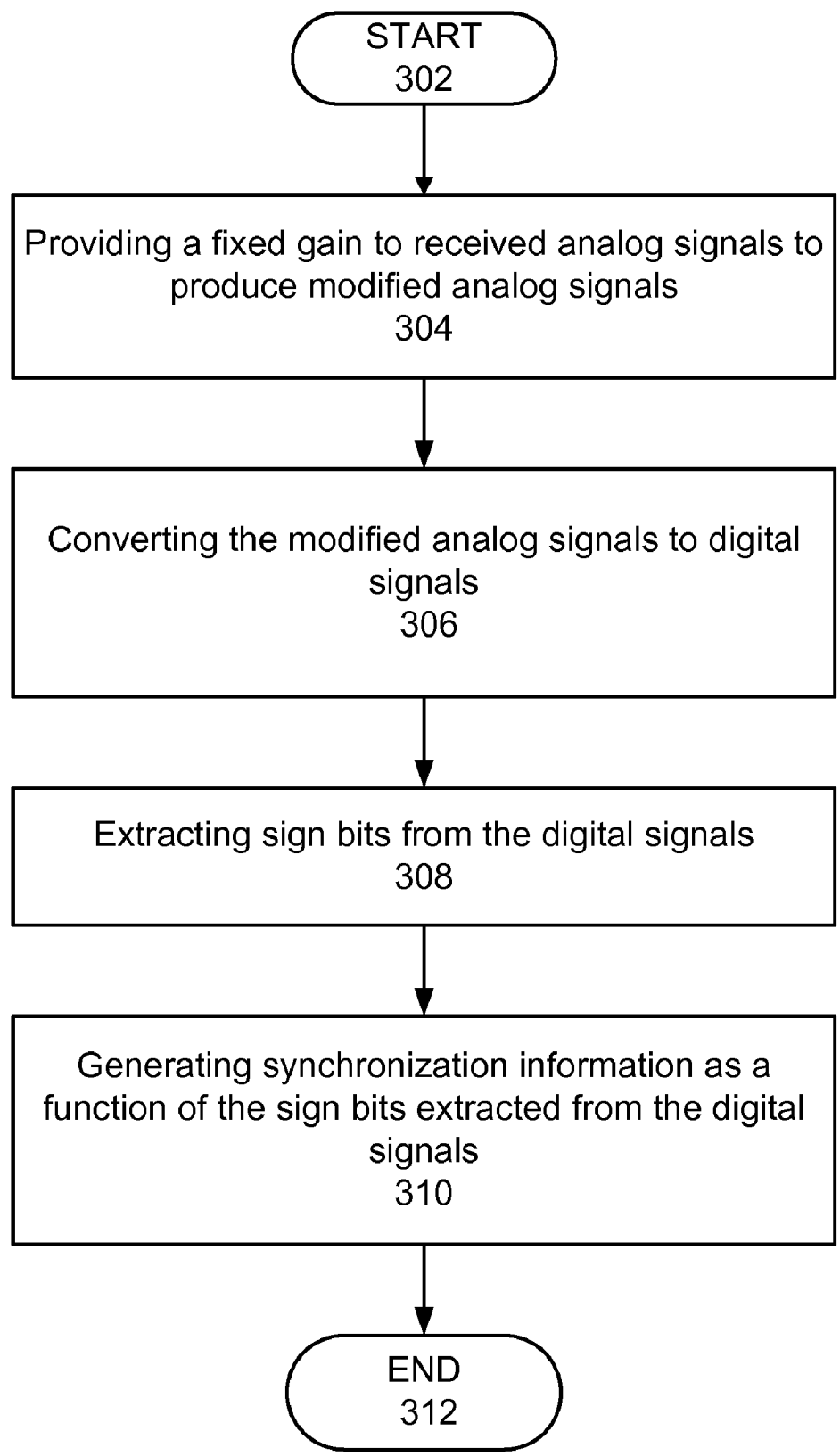
FIG. 3 illustrates a flowchart of the process to generate synchronization information, according to one embodiment of the invention.

FIG. 3 illustrates a flowchart of a method to generate synchronization information from received analog signals, according to one embodiment of the invention. The sequence starts in operation 302. Operation 304 is next and includes providing a fixed gain to received analog signals to produce modified analog signals. Operation 306 is next and includes converting the modified analog signals to digital signals. Operation 308 is next and includes extracting one or more sign bits from the digital signals. Operation 310 is next and includes generating synchronization information as a function of the sign bits extracted from the digital signals. The method ends in operation 312.

Figure 4:
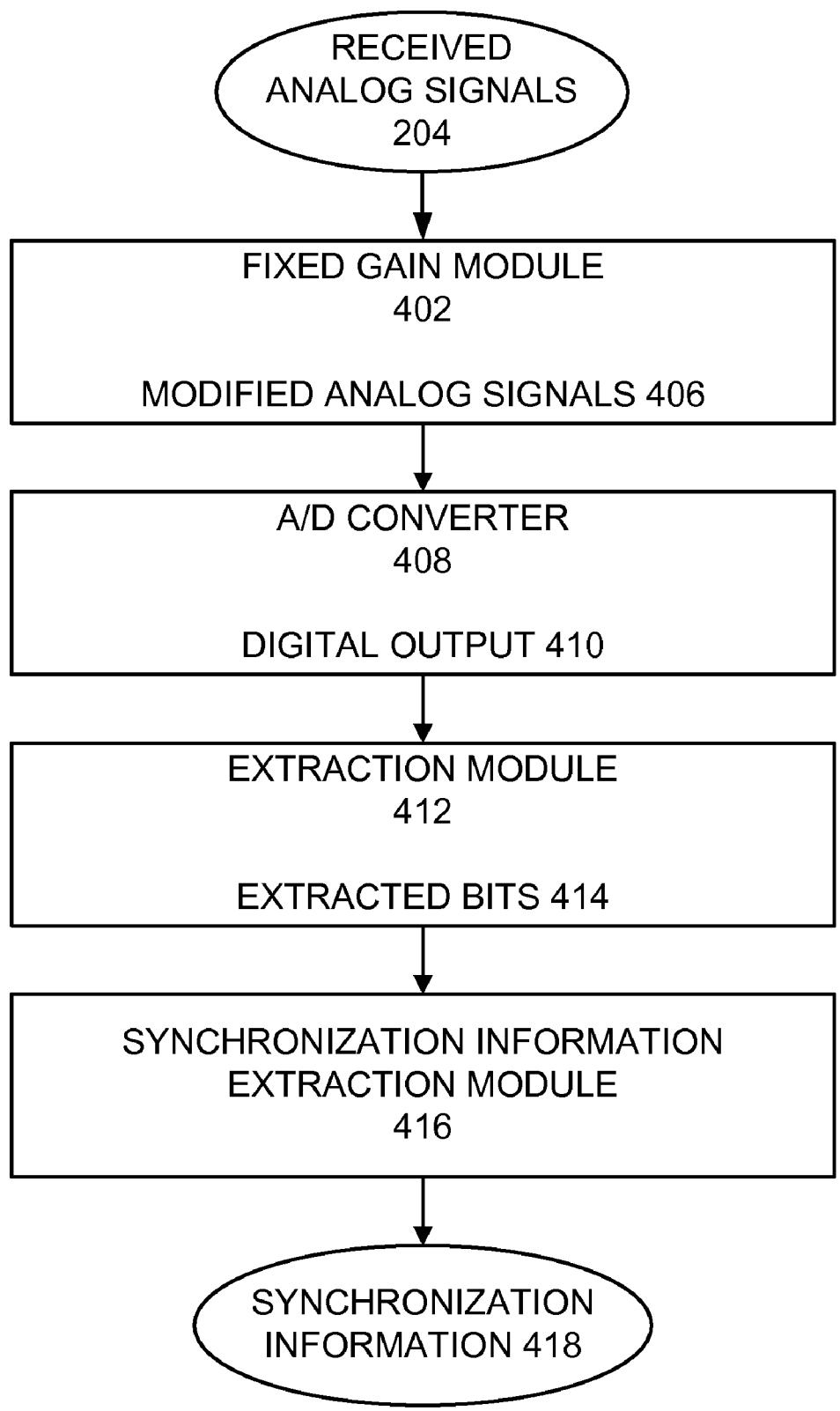
FIG. 4 illustrates a block diagram of a synchronization system, according to one embodiment of the invention.

FIG. 4 is a block diagram illustrating of a system to generate synchronization information from received analog signals, according to one embodiment of the invention. Fixed gain module 402 has received analog signals 204 as input and produces modified analog signals 406. Modified analog signals 406 are coupled to an analog-to-digital (A/D) converter 408 to produce digital output 410. Digital output 410 is coupled to extraction module 412 that will produce extracted digital bits 414. Extracted digital bits 414 are coupled to the input of synchronization information extraction module 416 that outputs synchronization information 418 for further use by the rest of the receiver.

In certain embodiments of the invention, the fixed gain module is an automatic gain control module, an amplifier module, or any equivalent module that can provide gain to the received analog signals to produce modified analog signals. In certain embodiments, the modified analog signals produced by the fixed gain module are in saturation. In certain embodiments of the invention, the A/D converter is a buffered or un-buffered A/D converter, or any equivalent module that can provide digital output substantially corresponding to the analog signals coupled to the input of the A/D converter. In certain embodiments of the invention, the extraction module is a mask to select only the sign bit of the digital signal, a mask to select only the sign bit and the most significant bit of the digital signal, a mask to select only the sign bit and some of the most significant bits of the digital signal, or any equivalent module that can provide the sign bits and a subset of the remaining digital signal bits produced by the A/D converter. In certain embodiments of the invention, generating synchronization information for the receiver also includes performing some operation, such as auto-correlation, cross-correlation, covariance, cross-variance of the received signals, or an equivalent.

Figure 5:
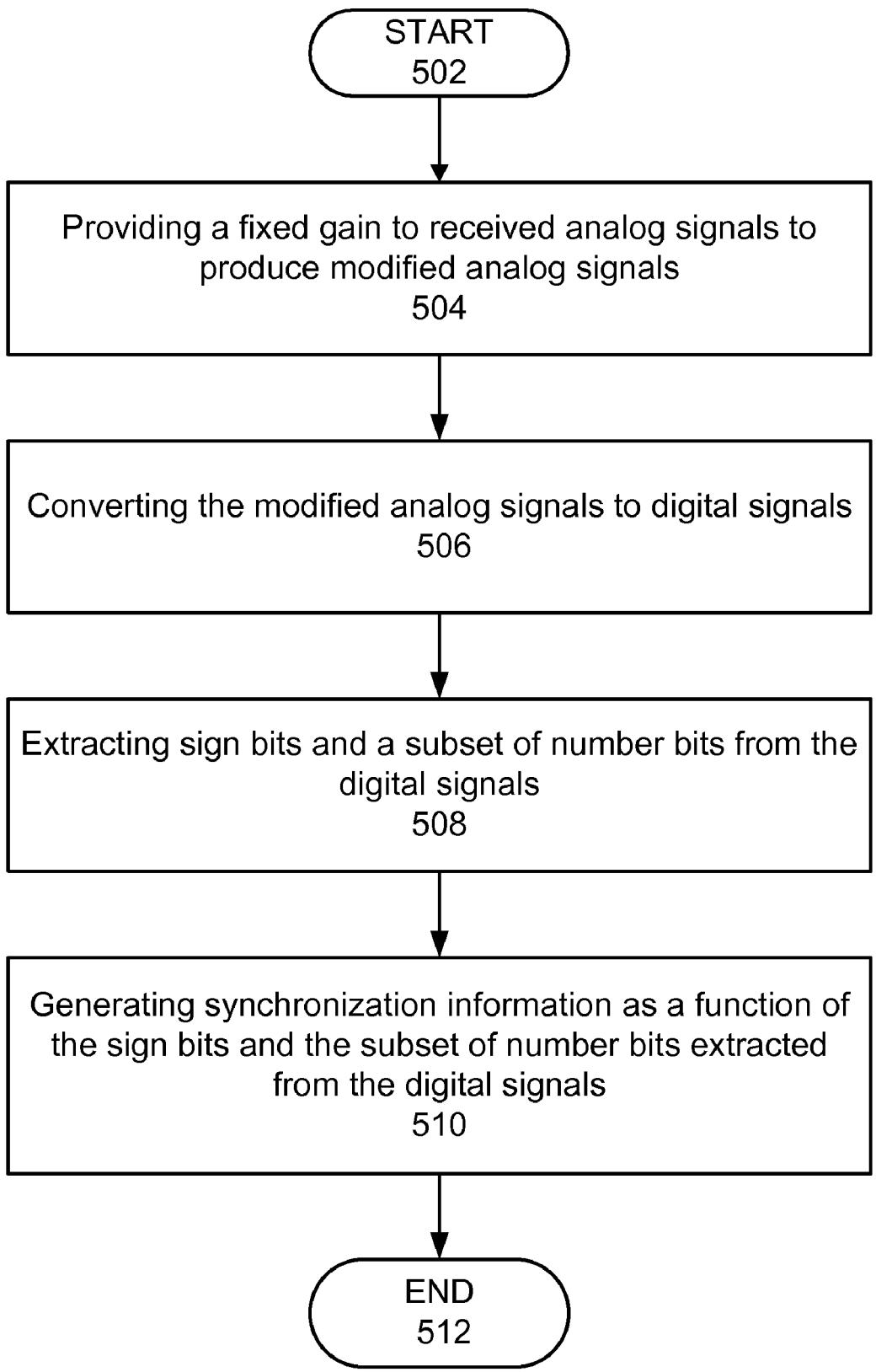
FIG. 5 illustrates a flowchart of the process to generate synchronization information, according to one embodiment of the invention.

FIG. 5 illustrates a flowchart of a method to generate synchronization information from received analog signals, according to another embodiment of the invention. The sequence starts in operation 502. Operation 504 is next and includes providing a fixed gain to received analog signals to produce modified analog signals. Operation 506 is next and includes converting the modified analog signals to digital signals. Operation 508 is next and includes extracting one or more sign bits and a subset of number bits from the digital signals. Operation 510 is next and includes generating synchronization information as a function of the sign bits and a subset of number bits extracted from the digital signals. The method ends in operation 512.

Figure 6:
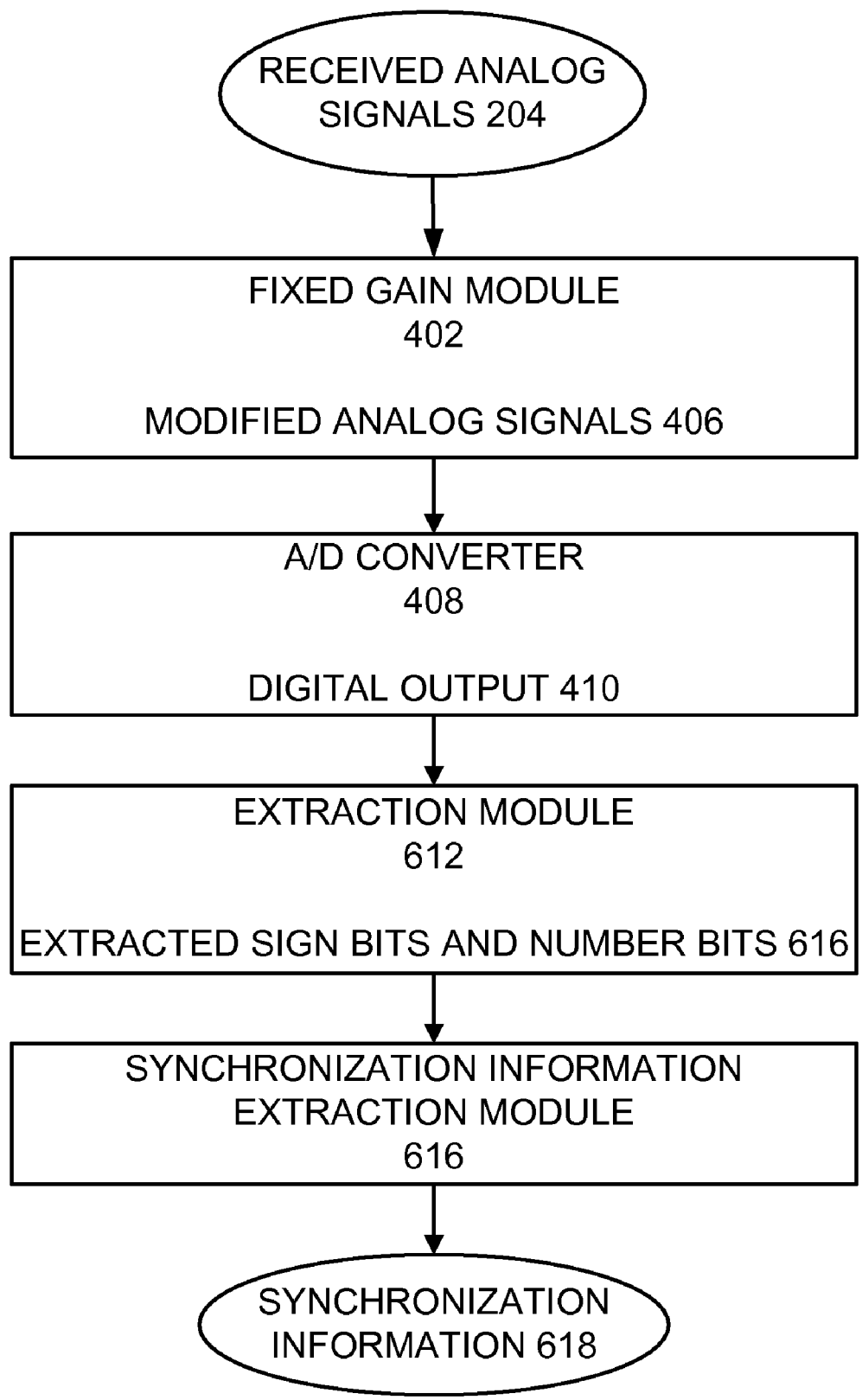
FIG. 6 illustrates a block diagram of a synchronization system, according to one embodiment of the invention.

FIG. 6 is a block diagram illustrating of a system to generate synchronization information from received analog signals, according to one embodiment of the invention. Fixed gain module 402 has received analog signals 204 as input and produces modified analog signals 406. Modified analog signals 406 are coupled to an analog-to-digital (A/D) converter to produce digital output 410. Digital output 410 is coupled to extraction module 412 that will produce extracted sign bits and number bits 614. Extracted sign bits and number bits 614 are coupled to the input of synchronization information extraction module 616 that outputs synchronization information 618 for further use by the rest of the receiver. The subset of number bits (taken either from the more significant or less significant bits) adds more information for synchronization beyond what is provided by the sign bits alone. However, the subset of number bits also requires more circuit inputs and circuitry complexity.

Figure 7:
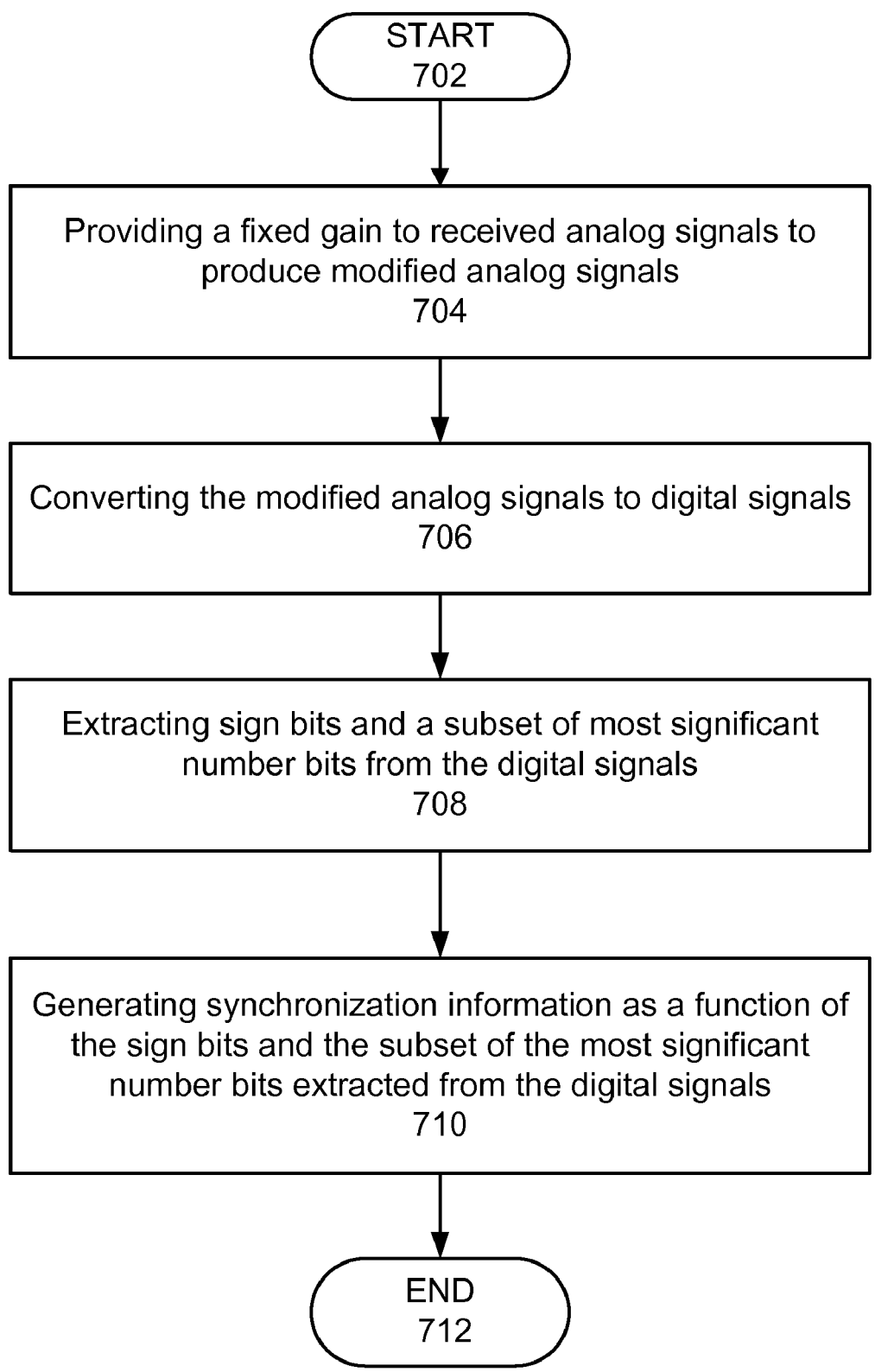
FIG. 7 illustrates a flowchart of the process to generate synchronization information, according to one embodiment of the invention.

FIG. 7 illustrates a flowchart of a method to generate synchronization information from received analog signals, according to one embodiment of the invention. The sequence starts in operation 702. Operation 704 is next and includes providing a fixed gain to received analog signals to produce modified analog signals. Operation 706 is next and includes converting the modified analog signals to digital signals. Operation 708 is next and includes extracting one or more sign bits and a subset of most significant number bits from the digital signals. Operation 710 is next and includes generating synchronization information as a function of the sign bits and a subset of the most significant number bits extracted from the digital signals. The method ends in operation 712.

Figure 8:
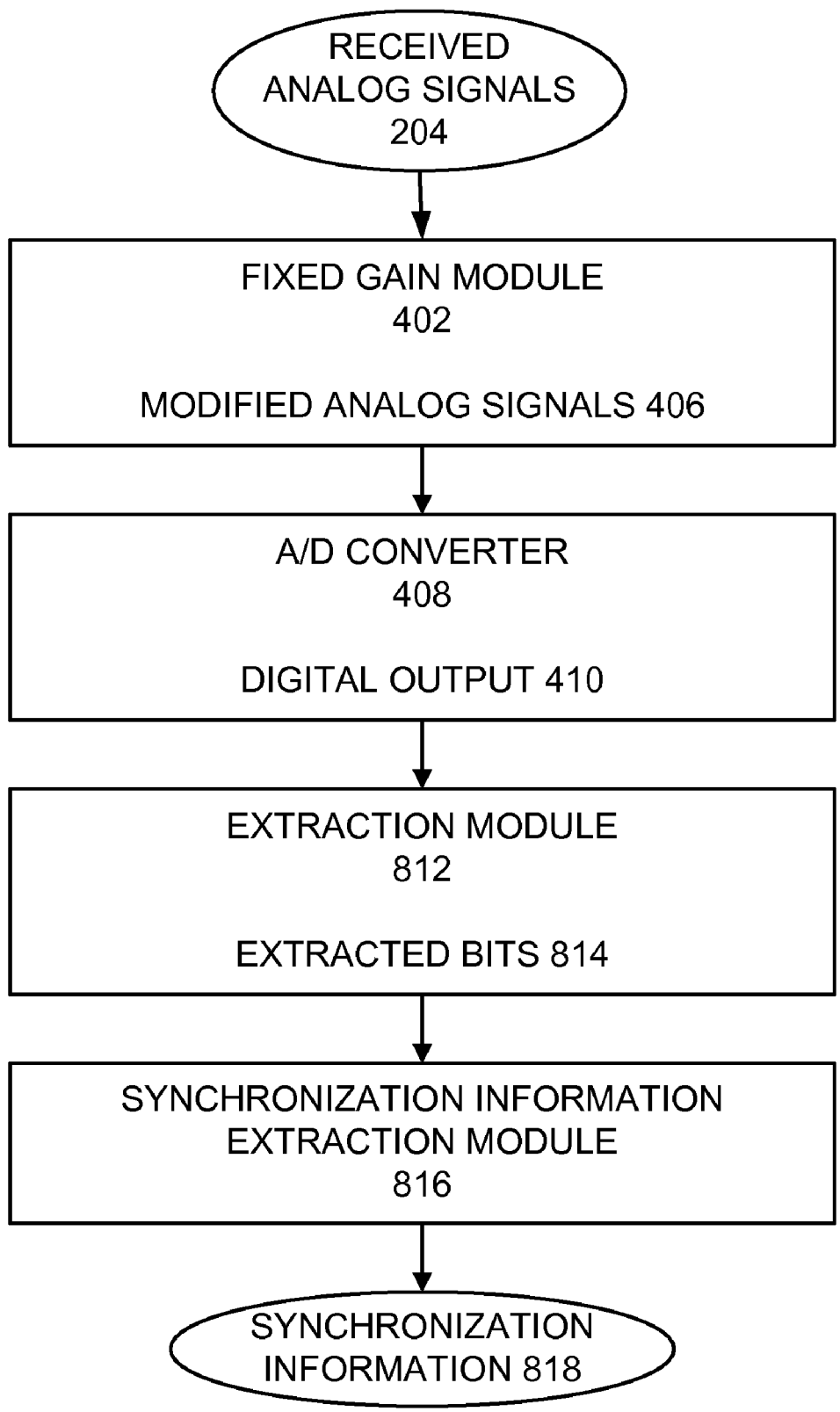
FIG. 8 illustrates a block diagram of a synchronization system, according to one embodiment of the invention.

FIG. 8 is a block diagram illustrating of a system to generate synchronization information from received analog signals, according to another embodiment of the invention. Fixed gain module 402 has received analog signals 204 as input and produces modified analog signals 406. Modified analog signals 406 are coupled to an analog-to-digital (A/D) converter to produce digital output 410. Digital output 410 is coupled to extraction module 812 that will produce extracted digital bits 814 from the sign bits and a subset of the most significant number bits of the digital output 410. Extracted digital bits 814 are coupled to the input of synchronization information extraction module 816 that outputs synchronization information 818 for further use by the rest of the receiver.

Several embodiments of the invention are possible. The phrase "in one embodiment" used in the specification can refer to a new embodiment, a different embodiment disclosed elsewhere in the application, or the same embodiment disclosed earlier in the application. The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method to generate synchronization information from a received analog signal, the method comprising:
   receiving the analog signal in a receiver;
   providing a fixed gain to the analog signal to generate a modified analog signal;
   converting the modified analog signal to a digital signal;
   extracting one or more sign bits from the digital signal to obtain a subset of sign bits; and
   generating synchronization information as a function of the one or more sign bits and the subset of the sign bits of the digital signal, wherein the subset of the sign bits are extracted in priority from a most significant bit towards a least significant bit.

2. The method of claim 1, wherein the fixed gain is a maximum gain.

3. The method of claim 1, wherein the fixed gain is a gain that is sufficiently large to cause saturation of the modified analog signal.

4. The method of claim 1, wherein the analog signal is a wireless signal being transmitted from a transmitter to the receiver in a wireless communication system, and the method is implemented in the receiver.

5. The method of claim 4, wherein the wireless communication system is in compliance with a standard selected from a group consisting of Orthogonal Frequency-Division Multiplexing Access (OFDM), Code Division Multiple Access (CDMA), Time Division Multiple Access (TDMA), and Global System for Mobile Communications (GSM).

6. The method of claim 1, wherein said providing the fixed gain includes using an automatic gain control module.

7. The method of claim 1, wherein said providing the fixed gain includes using an amplifier module.

8. The method of claim 1, wherein the synchronization information is used in an asynchronous communication system in compliance with a standard selected from a group of asynchronous communication systems consisting of: Orthogonal Frequency-Division Multiplexing Access (OFDM), Code Division Multiple Access (CDMA), Time Division Multiple Access (TDMA), and Global System for Mobile Communications (GSM).

9. The method of claim 1, wherein said extracting one or more sign bits from the digital signal to obtain a subset of sign bits is implemented with a mask designed to select only the subset of sign bits from the digital signal, the one or more sign bits and the most significant bit of the digital signal, or the one or more sign bits and some of the most significant bits of the digital signal.

10. A method to generate synchronization information from a received analog signal, the method comprising:
    providing a fixed gain to the received analog signal to generate a modified analog signal;
    converting the modified analog signal to a digital signal;
    extracting one or more sign bits from the digital signal by masking out some of most significant bits in the digital signal to form a subset of sign bits; and
    generating synchronization information as a function of the one or more sign bits, wherein the subset of sign bits are in priority from a most significant bit towards a least significant bit.

11. The method of claim 10, wherein the fixed gain is a maximum gain.

12. The method of claim 10, wherein the fixed gain is a gain that is sufficiently large to cause saturation of the modified analog signal.

13. The method of claim 10, wherein said generating synchronization information further includes one or more of operations including auto-correlation, cross-correlation, covariance, or cross-variance of the received analog signals.

14. The method of claim 13, wherein the received analog signal is a wireless signal being transmitted from a transmitter to a receiver in a wireless communication system, and the method is implemented in the receiver.

15. A system to generate synchronization information from a received analog signal, the system comprising:
    a fixed gain module to provide a fixed gain to the received analog signal to generate a modified analog signal;
    an analog-to-digital converter to convert the modified analog signal to a digital signal;
    an extraction module to extract one or more sign bits from the digital signal to obtain a subset of sign bits; and
    a synchronization information extraction module to generate synchronization information as a function of the one or more sign bits and the subset of the sign bits of the digital signal, wherein the subset of the sign bits are extracted in priority from a most significant bit towards a least significant bit.

16. The system of claim 15, wherein the fixed gain is provided by an automatic gain control module.

17. The system of claim 15, wherein the fixed gain is a gain that is sufficiently large to cause saturation of the modified analog signal.

18. The system of claim 15, wherein the system is a receiver receiving the analog signal from a transmitter in a wireless communication system.

19. The system of claim 18 wherein the wireless communication system is in compliance with a standard selected from a group consisting of Orthogonal Frequency-Division Multiplexing Access (OFDM), Code Division Multiple Access (CDMA), Time Division Multiple Access (TDMA), and Global System for Mobile Communications (GSM).

20. The system of claim 15, wherein the synchronization information is used in an asynchronous communication system selected from a group of asynchronous communication systems consisting of Orthogonal Frequency-Division Multiplexing Access (OFDM), Code Division Multiple Access (CDMA), Time Division Multiple Access (TDMA), and Global System for Mobile Communications (GSM).

* * * * *